United States Patent [19]

Ping et al.

[11] 4,452,332

[45] Jun. 5, 1984

[54] APPARATUS AND METHOD FOR MOUNTING A TRANSMISSION

[75] Inventors: David T. Ping; Edwin Reeve, both of Mentor; Philip S. Webber, Chardon, all of Ohio

[73] Assignee: Towmotor Corporation, Mentor, Ohio

[21] Appl. No.: 398,051

[22] Filed: Jul. 14, 1982

[51] Int. Cl.³ ............................................. B60K 17/16
[52] U.S. Cl. ..................................... 180/312; 29/426.1
[58] Field of Search ........................ 180/312, 75, 54 R; 29/426.1

[56] References Cited

U.S. PATENT DOCUMENTS

| 3,207,249 | 9/1965 | Singer et al. | 180/54 |
| 3,662,849 | 5/1972 | Bostad et al. | 180/54 |
| 3,834,476 | 9/1974 | Donaldson | 180/312 |
| 4,100,986 | 7/1978 | Shipitalo | 180/75 |
| 4,100,987 | 7/1978 | Hildebrecht | 180/75 |
| 4,100,988 | 7/1978 | Hildebrecht | 180/75 |
| 4,262,766 | 4/1981 | Brown et al. | 180/75 |

OTHER PUBLICATIONS

Advertisement for "Lord Kinematics" entitled Center Bonded Joints.

Primary Examiner—Richard A. Bertsch
Attorney, Agent, or Firm—Alan J. Hickman

[57] ABSTRACT

This invention relates to an apparatus and method for mounting a transmission (32) in a frame (10) of a vehicle (12) which eliminates the problems of accessibility, complexity and the need to elevate the vehicle for access from beneath. The mounting arrangement has a first trunnion (42) releasably connected to a first side (34) of the transmission (32) which is slidably disposed in an aperture of a first side member (14) of a frame (10) and a second trunnion (52) releasably connected to a second side (36) of the transmission (32) and slidably disposed in an aperture in a second side (16) of the frame (10) and a guide apparatus (72) for slidably connecting a second end (40) of the transmission (32) to the frame (10) and guiding the transmission (32) for movement in directions substantially normal to a transverse trunnion axis defined by said trunnions. Thus, the mounting arrangement eliminates the problems of installation of a transmission from beneath a vehicle frame and facilitates faster installation and removal while providing support for the transmission during installation. The mounting arrangement is particularly useful in a fork lift truck.

15 Claims, 4 Drawing Figures

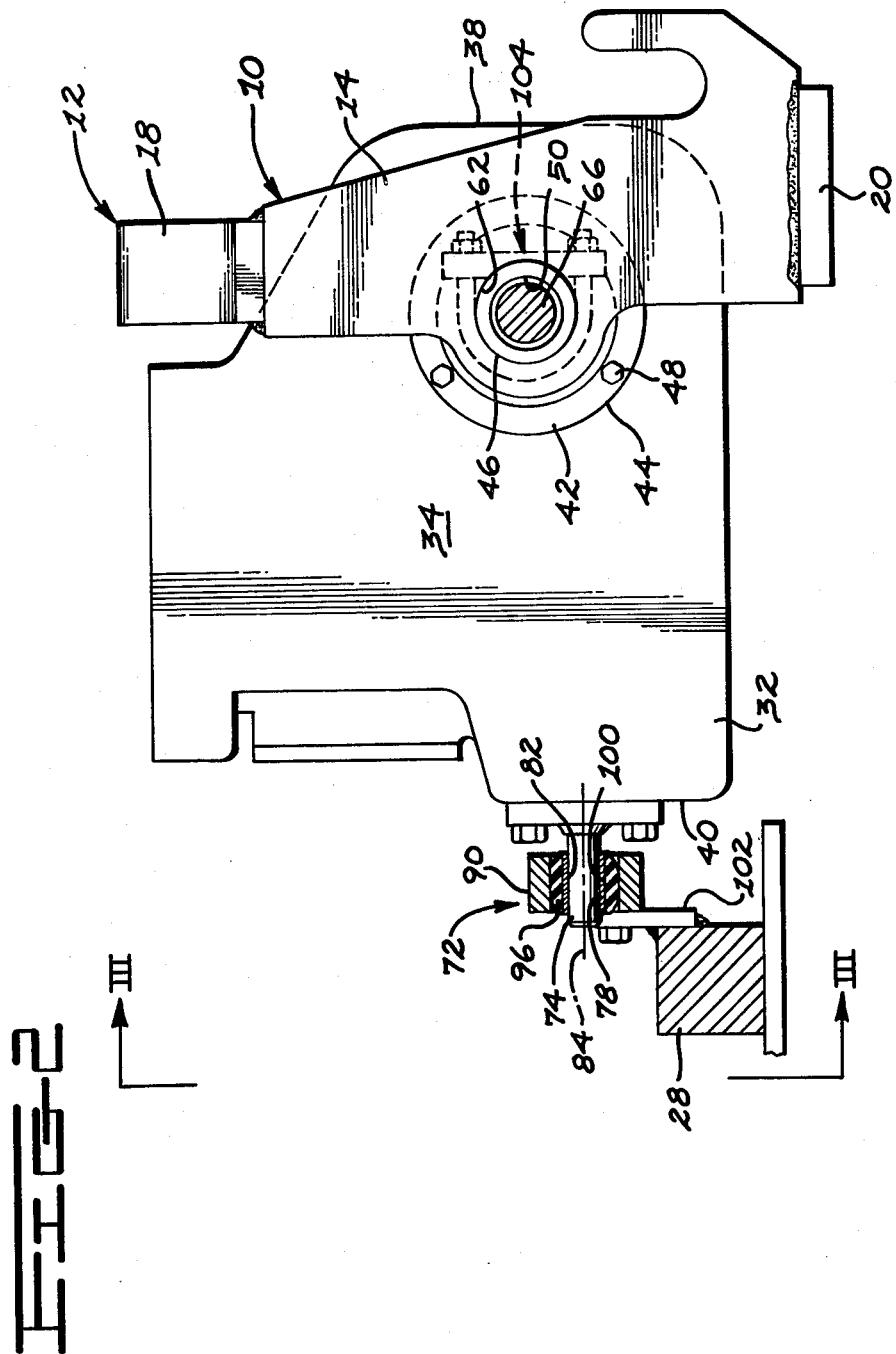

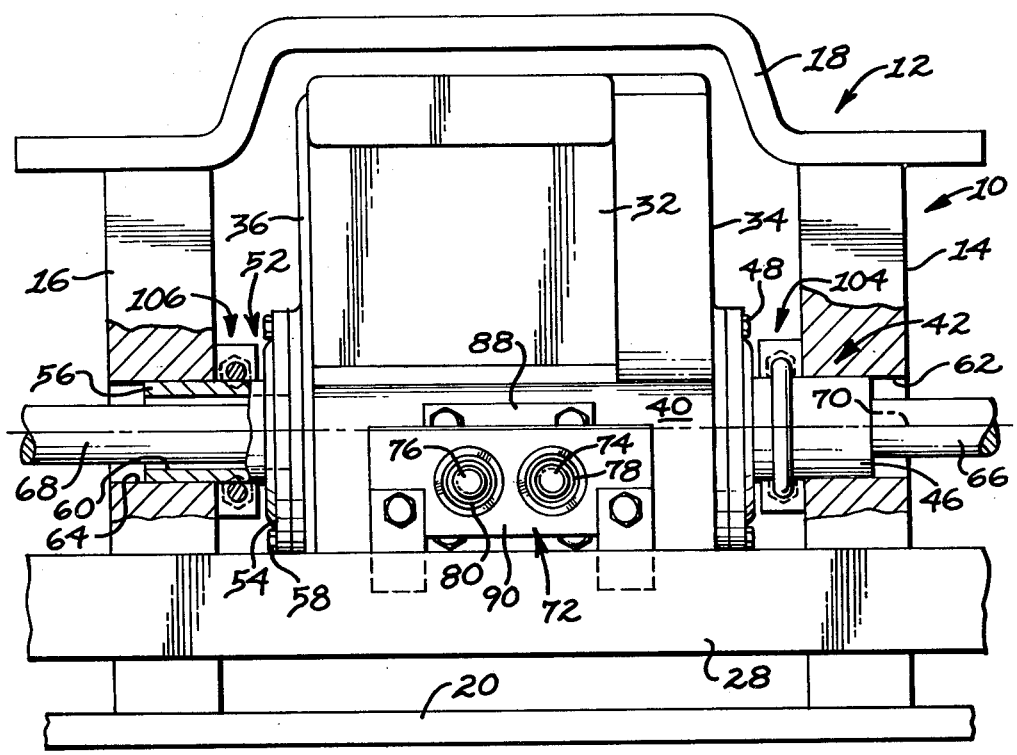
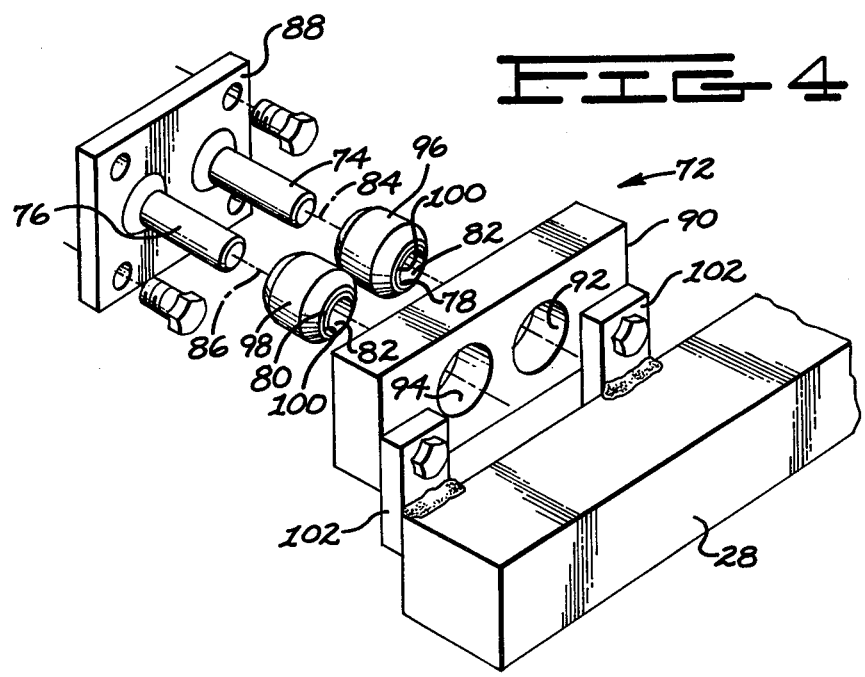

APPARATUS AND METHOD FOR MOUNTING A TRANSMISSION

DESCRIPTION

1. Technical Field

The present invention relates to an apparatus and method for mounting a transmission to a vehicle frame.

2. Background Art

A variety of fork lift trucks are available wherein the transmission is connected to the vehicle frame at a location directly behind the lift mast. Usually, the transmission is bolted to the frame at three locations thereon so that the transmission is fully supported. At least one of these locations is adjacent the rear end portion of the transmission and is accessible for disconnection from the vehicle frame by access thereto from beneath the vehicle. Therefore, in order to remove the transmission from the vehicle frame for service or repair, it is necessary that the service technician elevate the fork lift truck and from beneath the vehicle unbolt a plurality of transmission mounts and remove the transmission from beneath the fork lift truck. Such a procedure while effective to accomplish its desired end results is complex and time consuming.

Accordingly, there is a need to provide a transmission mounting arrangement for a fork lift truck which permits the transmission to be easily accessed and removed from the vehicle which overcomes one or more of the problems as set forth above.

DISCLOSURE OF THE INVENTION

In one aspect of an embodiment of the present invention, a mounting arrangement for connecting a transmission to a vehicle frame is provided. The mounting arrangement has a first trunnion and a second trunnion releasably connected to a first and second side of the transmission respectively. The first trunnion is slidably disposed in an aperture in a first side of the vehicle frame and the second trunnion is slidably disposed in an aperture in the second side of the frame. A guide member slidably connects a second end of the transmission to the frame at a location spaced from the first and second trunnion and guides the transmission for movement in directions substantially normal to a transverse axis defined by the trunnions.

The method of an embodiment of the present invention includes the steps of sliding a first axle shaft from connection with a transmission, sliding a second axle shaft from connection with the transmission, releasing a first trunnion from connection with a first side of the transmission, sliding the first trunnion away from the transmission first side and toward a first side of a frame, releasing a second trunnion from connection with a second side of the transmission, sliding the second trunnion away from the transmission's second side and toward a second side of the frame, and sliding a first end of the transmission through an end opening of the frame to disengage a first guide shaft connected to a second end of the transmission from engagement with a bore of a frame mounted bushing.

BRIEF DESCRIPTION OF THE DRAWINGS

FIG. 2 is a diagrammatic side elevational view of the transmission and frame of FIG. 1 showing portions of the mounting arrangement broken away;

FIG. 3 is a diagrammatic rear elevational view of the transmission and frame of FIG. 1 with portions of the frame broken away to better illustrate the mounting arrangement; and FIG. 4 is an exploded diagrammatic view of a guide assembly of the mounting arrangement located at a second end of the transmission.

BEST MODE FOR CARRYING OUT THE INVENTION

Figure 1:
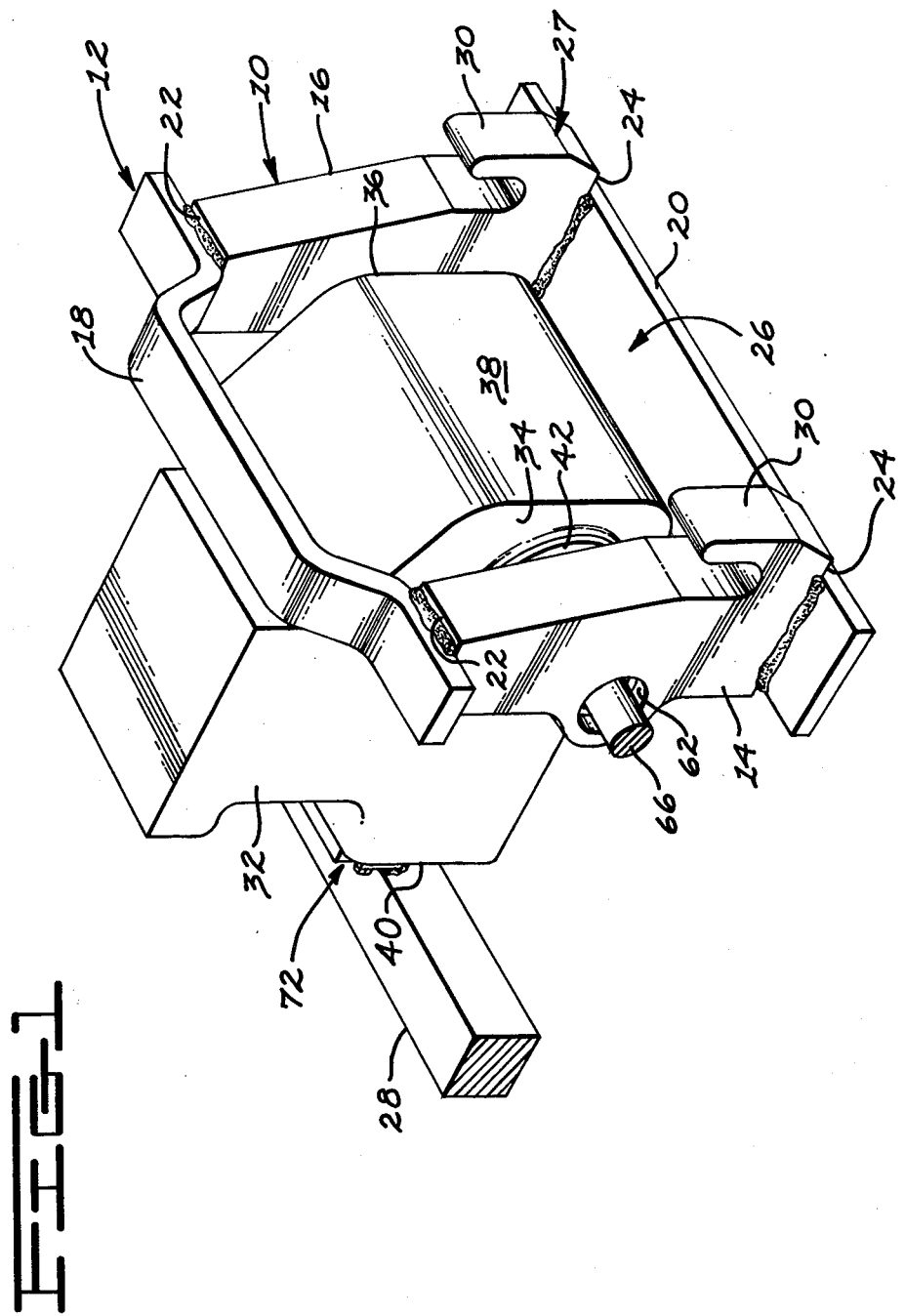
FIG. 1 is a diagrammatic isometric view of a transmission mounted on a portion of a vehicle frame by the mounting arrangement of the present invention.

With reference to the drawings of FIGS. 1–3, a forward portion of a frame 10 of a fork lift truck 12 is shown. Frame 10 includes a first and second side 14 and 16, and upper 18 and lower 20 plates. The upper plate 18 is connected to an upper end 22 of the first and second sides 14 and 16, and the lower plate 20 is connected to a lower end 24 of the first and second sides 14 and 16. The sides 14 and 16 are spaced a preselected distance apart and the upper and lower plates are spaced a preselected distance apart so as to provide a forwardly located opening 26 of a predetermined size at a front end 27 of the fork lift truck 12. The frame also includes a transverse support member 28 which is interconnected to the vehicle frame. Each of the first and second side members 14 and 16 have an upwardly opening forwardly extending hook portion 30 for mounting a lift mast thereon.

A transmission 32 has a first and second side 34 and 36 and a first front and second rear end 38 and 40.

A first trunnion 42 having a flange 44 and a sleeve 46 is mounted on the first side 34 of the transmission 32 by a plurality of bolts 48. A bore 50 is disposed in the first trunnion and extends through the sleeve and flange 44 and 46. A second trunnion 52 having a flange 54 and a sleeve 56 is mounted on the second side 36 of the transmission 32 via a plurality of bolts 58. A bore 60 is disposed in the second trunnion and extends through the sleeve 56 and flange 54. The sleeve 46 of the first trunnion 42 is slidably disposed in a through bore 62 in the first side member 14 of the frame and the sleeve 56 of the second trunnion 52 is slidably disposed in a through bore 64 in the second side member 16 of the frame 10.

A first axle shaft 66 is removably connected to transmission 32 and extends from the transmission through bore 50 to a location beyond the first side member 14 of vehicle frame 10. Likewise, a second axle shaft 68 is removably connected to the transmission and extends from the transmission through the bore 60 to a location beyond the second side member 16 of vehicle frame 10. It is to be noted that the first and second trunnions 42 and 52 are in alignment one with the other and define an axis 70 which is transverse to the vehicle frame. The first and second trunnions 42 and 52 connects the transmission to the frame and allows a limited amount of pivotal movement of the transmission about the trunnions and a limited amount of axial movement along said transverse axis 70.

Referring to FIGS. 2 and 4, a guide apparatus 72 is provided for slidably connecting the transmission second end 40 to the frame 10. More specifically, the guide apparatus 72 slidably connects the transmission second end to the transverse support member 28 and guides the transmission for movement in directions substantially normal to the trunnion axis 70. The guide apparatus includes first 74 and second 76 shafts having a preselected length and a first 78 and second 80 bushing each having a bore 82 of a preselected length. The first and second shafts 74 and 76 are connected to the second or rear end 40 of the transmission 10 at a location adjacent one another and a preselected distance apart. The shafts are oriented so that they are parallel to one another along their length. The first and second bushings 78 and 80 are connected to the transverse support member 28 and oriented so that their bores 82 are spaced apart the same preselected distance as that of the first and second shafts 74,76 and parallel along their bore length. The first and second shafts are slidably disposed in the bore 82 of the first and second bushings 78 and 80 respectively. The first shaft 74 and first bushing 78 define a first longitudinal axis 84 relative to the frame 10 which is substantially normal to the trunnion axis 70 and the second shaft 76 and second bushing 80 define a second longitudinal axis 86 relative to the frame which is substantially normal to the transverse trunnion axis 70. The first 74 and second 76 shafts predetermined length permits a preselected amount of slidable movement of the transmission 32 prior to disengagement of the shafts 74 and 76 from their respectively engaged bushings 78 and 80.

More specifically, the first and second shafts 74 and 76 are connected to a flange 88, such as by welding, and the flange 88 is bolted to the second end 40 of the transmission 10. A bracket 90 having a first and second bore 92 and 94 and a first and second resilient bushing 96 and 98 each having a bore 100 is provided for mounting the first and second bushings to the transverse support member 28. The first and second bushings are securely positioned in the bore 100 of the first and second resilient bushings 96 and 98 respectively and the resilient bushings are securely positioned in the first 92 and second bores 94 respectively of bracket 90. Bracket 90 is secured to flanges 102 which are welded to the transverse support member 28 and bolted to the bracket 90.

First 104 and second 106 clamps, in the form of a U-clamp which is well known in the art, are connected to the first and second trunnions 42 and 52 respectively. Specifically, the first clamp is positioned about the sleeve 46 of the first trunnion at a location between the first side 34 of transmission 32 and the first side 14 of frame 10 and clampingly connected thereto. The second clamp 106 is disposed about the sleeve 56 of the second trunnion 52 at a location between the second side 36 of transmission 32 and the second side 16 of frame 10 and clampingly secured thereto. Both clamps 104 and 106 retain the transmission from transverse movement when in place and permit sliding motion of the trunnions 42 and 52 along the trunnion axis 70 when removed.

INDUSTRIAL APPLICABILITY

Due to the mounting arrangement as previously described installation and removal of the transmission from the vehicle frame 10 may be performed while the vehicle is resting on a surface and without the need of elevating the vehicle to a raised position from the surface. To disassemble the transmission from the vehicle frame 10 and subsequent to removal of the lift mast (not shown) from the vehicle frame the following steps are to be taken. Firstly, the first and second axle shafts 66 and 68 are slid from connection with the transmission outwardly of the vehicle frame and removed therefrom. Secondly, the clamps 104 and 106 are loosened and removed from their respective trunnions 42 and 52. The plurality of bolts 48 and 58 are then removed from their respective trunnions 42 and 52 which releases the trunnions from connection with the transmission 32. The trunnions are then slid outwardly, away from the transmission, and toward the adjacent first and second side frame members. The front end of the transmission is thus free from connection to the vehicle. The transmission is then slid forwardly toward the front of the vehicle through the opening 26 until the first and second shafts 74 and 76 are free from connection with the first and second bushings 78 and 80 respectively. At this point the transmission is totally free from connection of the vehicle 12 and may be totally removed therefrom from the front of the frame 10.

Thus, it can be seen that the guide apparatus 72 not only resiliently supports the second end 40 of the transmission but serves to support the second end of the transmission during removal and installation thereof to facilitate assembly as previously mentioned without requiring servicing from beneath the vehicle frame.

It is also to be noted that although two shafts and two bushings have been described in detail with respect to the guide apparatus 72 a single shaft and single bushing would also provide the functional advantages as herein described.

Installation of the transmission in the vehicle are achieved in the same manner as removal, but in reverse order.

In view of the foregoing, there is provided a mounting arrangement for connecting a transmission to a vehicle frame 10 through an end opening thereof. Thus the need for raising the vehicle to an elevated positioning for installation from therebeneath is eliminated.

Other aspects, objects and advantages of the invention can be obtained from a study of the drawings, disclosure and appended claims.

We claim:

1. A mounting arrangement (42,52,72) for connecting a transmission (32) having a first (34) and second side (36) and a first (38) and second end (40) to a vehicle (12) having a frame (10) comprising:

said frame (10) having first and second spaced apart sides (14,16) and upper and lower spaced apart plates (18,20) connected to each of said first (14) and second (16) sides, said first and second sides (14,16) each having a bore (62,64) therethrough;

a first trunnion (42) having a flange (44) and a sleeve (46) connected to said flange (44), said flange (44) being releasably connected to said transmission first side (34) and said sleeve (46) being slidably disposed in the bore (62) of said frame first side (14);

a second trunnion (52) having a flange (54) and a sleeve (56) connected to said flange (54), said flange (54) being releasably connected to said transmission second side (36) and said sleeve (56) being slidably disposed in the bore (64) of said frame second side (16), said first and second sleeves (46,56) defining a transverse trunnion axis (70); and a guide means (72) for slidably connecting said transmission second end (40) to said frame (10) at a location spaced from said first and second trunnions (42,52) and guiding said transmission (32) for movement in directions substantially normal to said transverse trunnion axis (70).

2. The mounting arrangement (42,52,72) as set forth in claim 1 wherein said first and second frame sides (14,16) and said upper and lower plates (18,20) define an opening (26) therethrough, said opening (26) being of size sufficient to permit passing of said transmission (32) therethrough.

3. The mounting arrangement (42,52,72) as set forth in claim 2 wherein said opening (26) defines a front end (27) of said vehicle (12).

4. The mounting arrangement (42,52,72) as set forth in claim 1 wherein said guide means (72) includes; a first shaft (74) and a first bushing (78) having a bore (82) therethrough, said first shaft (74) being connected to said transmission second end (40) and said first bushing (78) being connected to said frame (10), said first shaft (74) being slidably disposed in the bore (82) of said first bushing (78).

5. The mounting arrangement (42,52,72) as set forth in claim 4 wherein said first shaft (74) and the bore (82) of said first bushing (78) define a first longitudinal axis (84), said first longitudinal axis being oriented in a direction substantially normal to the transverse trunnion axis (70).

6. The mounting arrangement (42,52,72) as set forth in claim 5 wherein said first shaft (74) has a predetermined length sufficient to support said transmission second end (40) during a preselected amount of movement of said transmission (32) relative to said frame opening (26) and along said first longitudinal axis (84).

7. The mounting arrangement (42,52,72) as set forth in claim 5 wherein said guide means (72) further includes a second shaft (76) and a second bushing (80) having a bore (82) therethrough, said second shaft (76) being connected to said transmission second end (40) at a preselected distance spaced from and adjacent said first shaft (74) and said second bushing (80) being connected to said frame (10) at a preselected distance spaced from and adjacent to said first bushing (78), said second shaft (76) and the bore (82) of the second bushing (80) define a second longitudinal axis (86), said second longitudinal axis (86) being parallel to said first longitudinal axis (84).

8. The mounting arrangement (42,52,72) as set forth in claim 7 wherein said first and second shafts (74,76) are connected to a flange (88), said flange (88) being bolted to said transmission second end portion (40).

9. The mounting arrangement (42,52,72) as set forth in claim 8 wherein said guide means (72) includes a bracket (90) having a first and second bore (92,94) and a first and second resilient bushing (96,98) each having a bore (100), said bracket (90) being connected to the frame (10) and said first and second resilient bushings (96,98) being disposed in the first and second bores (92,94) respectively, of the bracket (90), said first bushing (78) being disposed in the bore (100) of said first resilient bushing (96) and said second bushing (80) being disposed in the bore (100) of said second resilient bushing (98).

10. The mounting arrangement (42,52,72) as set forth in claim 9 wherein said guide means (72) includes a transverse support member (28) mounted on said frame (10) at a location spaced from said upper and lower plates (18,20) and said bracket (90) being connected to said transverse support member (28).

11. The mounting arrangement (42,52,72) as set forth in claim 1 wherein said transmission (32) includes a first and second axle shaft (66,68) slidably removably connected to said transmission (32), said first and second trunnions (42,52) each having a bore (50,60) therethrough, said first axle shaft (66) projects from said transmission (32) and extends through said first trunnion bore (50) and past said first frame side (14), and said second axle shaft (68) projects from said transmission (32) and extends through said second trunnion bore (60) past said second frame side (16).

12. The mounting arrangement (42,52,72) as set forth in claim 11 wherein said first trunnion (42) pivotally connects the transmission (32) to the first frame side (14) and the second trunnion (52) pivotly connects the transmission (32) to the second frame side (16).

13. The mounting arrangement (42,52,72) as set forth in claim 1 including:
a first and second clamp (104,106), said first clamp (104) being disposed about said first trunnion sleeve (46) at a location between said transmission first side (34) and said first frame side (14) and said second clamp (106) being disposed about said second trunnion sleeve (56) at a location between said transmission second side (36) and said second frame side (16), said first clamp (104) being releasably connected to the sleeve (46) of said first trunnion (42) and said second clamp (106) being releasably connected to the sleeve (56) of said second trunnion (52).

14. A method for removing a transmission (32) having first and second opposite sides (34,36) and first and second opposite ends (38,40) from an end opening (26) of a frame (10) of a vehicle (12) including the steps of:
sliding a first axle shaft (66) from connection with the transmission (32);
sliding a second axle shaft (68) from connection with the transmission (32);
releasing a first trunnion (42) from connection with the first side (34) of said transmission (32);
sliding the first trunnion (42) away from said transmission first side (34) and toward a first side (14) of said frame (10);
releasing a second trunnion (52) from connection with the second side (36) of said transmission (32);
sliding the second trunnion (52) away from said transmission second side (36) and towards a second side (16) of said frame (10); and
sliding the transmission first end (38) through the frame end opening (26) and along a first guide shaft (74) connected to the second end (40) of said transmission (32) to disengage said first guide shaft (74) from engagement in a bore (82) of a first frame mounted bushing (78).

15. The method as set forth in claim 13 including the steps of:
removing a first clamp (104) connected to said first trunnion (42) at a location between the transmission (32) first side (34) and frame first side (14) prior to releasing the first trunnion (42) from connection with said transmission (32); and
removing a second clamp (106) connected to said second trunnion (52) at a location between the transmission (32) second side (36) and frame second side (16) prior to releasing the second trunnion (52) from connection with said transmission (32).

* * * * *